May 16, 1961  H. LINDEMANN  2,984,493
PIPE CLAMPING FIXTURE
Filed May 20, 1958
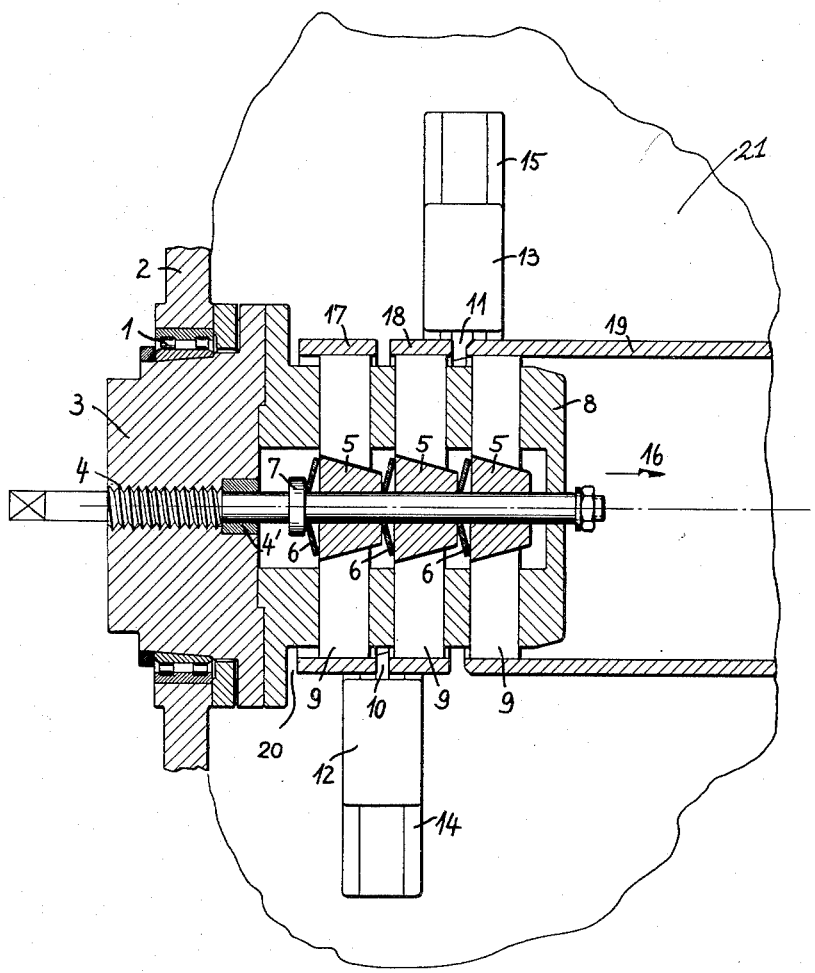
INVENTOR
HANS LINDEMANN
BY Dicke and Craig
ATTORNEYS United States Patent Office 2,984,493
Patented May 16, 1961

2,984,493
PIPE CLAMPING FIXTURE

Hans Lindemann, Bielefeld, Germany, assignor to Th. Calow & Co. Maschinenfabrik u. Eisengiesserei, Bielefeld, Germany Filed May 20, 1958, Ser. No. 736,532

Claims priority, application Germany May 21, 1957

2 Claims. (Cl. 279—2)

The present invention relates to a new clamping fixture for pipes and the like, and especially for pipes of a relatively large diameter such as are used, for example, for oil pipe lines. The clamping fixture according to the invention is primarily intended for gripping such a pipe to permit at least one end thereof to be cut off straight and for then chamfering such end.

As long as the pipes which are to be worked on at one or both ends have a relatively small diameter, it is usually advisable to do this by means of machine tools which are provided with revolving cutter heads. The pipes are then supplied through a suitable feeding frame to a roller bed which feeds one pipe at a time to a machine tool in front of which it is then clamped in a fixed position by a suitable clamping fixture. The pipe is then worked on either by being fed toward the revolving cutter head or by moving the latter toward the pipe. After the work has been completed, the pipe is again retracted and then passed to a second machine tool, which may be done by passing the pipe to another roller bed by means of a suitable transverse feeding mechanism. After the other end of the pipe has also been finished, it is then passed to a suitable runway to be conveyed to another place.

If, however, the pipes to be worked on, for example, by chamfering their ends, have a relatively large diameter, it is usually impractical to do this by means of revolving cutter heads since it would entail certain difficulties, for example, those involving the chip conveyance and the feeding of the cutting tools. It is therefore usually more simple and inexpensive to provide each machine tool with a clamping fixture which is adapted to grip and rotate the pipe. Since the pipe is likewise fed to the clamping fixture and the machine tool by means of roller beds, it is necessary to provide not only the required transverse feeding mechanisms but also steadies on which the pipe is to be supported while being worked on. Generally speaking, outside clamping fixtures are used for this purpose. Although inside clamping fixtures are well-known as such, they have so far not been used in cutting-off or chamfering machines.

The pipes which are used for building oil pipe lines must not only be provided at both ends with an absolutely level surface which extends at a right angle to the longitudinal axis of the pipes, but must also be chamfered at their ends so as to permit the adjacent pipes to be welded together. The cutting tool to be used for this purpose consists of a shaping tool which has an edge for cutting off the end of the pipe and another cutting edge for chamfering. Since such large pipes have a welded seam, they have to be carefully examined before they are welded to each other to determine whether the welded seam is perfect. This is usually done by cutting off at least one small ringlike piece of each pipe and then testing the seam of such piece. It is therefore necessary not only to cut off the misshaped ends of the pipes but also to cut off a ringlike portion as a specimen to be tested, aside from chamfering each end.

It is an object of the present invention to provide suitable means which permit these different working steps on each end of a pipe to be carried out by a single operation in which not only the uneven or deformed ends of the pipe are removed and the end surfaces are cut off straight and are then chamfered, but in which at least one ringlike portion is at the same time cut off as a specimen.

This object may, according to the invention, be attained by the provision of an internal clamping fixture, in which two, and preferably three, sets of clamping jaws which are mounted in a mandrel-like housing at an axially spaced relation to each other, and each within a different radial plane, may be tightened against the inner wall of the pipe by means of conical members which in the inoperative position are slidable independently of each other in the axial direction, but are movable simultaneously for tightening the clamping jaws. The spaced relation of the clamping jaws then permits the cutting tool or tools to work on the pipe between the individual jaw sets. If only one tool is to be used, in which event the normally worthless outer end of the pipe is used as a test specimen, this tool is provided with one edge for cutting off and another for chamfering. The conical members are preferably mounted on a shaft which is movable in the axial direction, and each of them is acted upon by a separate spring. Two of these springs preferably rest upon the adjacent conical members, while the third spring rests upon a flange of the shaft.

Further objects, features, and advantages of the present invention will be apparent from the following detailed description thereof, particularly when read with reference to the accompanying drawing which diagrammatically and in cross section illustrates one preferred embodiment of the invention.

The new clamping fixture consists of a member 3 which may be driven by a motor, not shown, and is rotatable on roller bearings 1 within a stationary bearing element 2 fixedly mounted on the base 21. Member 3 has a central bore in which a shaft 4 is mounted, for example, in a bushing 4', so as to be shiftable in the axial direction. Shaft 4 carries on one end portion three conical members 5 which have an inner diameter of a size so as to permit them to slide easily along shaft 4. Each conical member is acted upon by a spring 6, two of which are shown to rest upon the adjacent conical member 5, while the third spring rests upon a flange 7 which is secured to or integral with shaft 4. The rotary member 3 carries a cup-shaped member 8 which is rigidly secured thereto and is provided with a bore for receiving shaft 4, and also with radially extending recesses through which the clamping jaws 9 extend. These clamping jaws 9 rest at one side upon the tapered peripheral surfaces of the conical members 5, while their outer ends are adapted to engage with the inner wall of a pipe which is to be rotated. Although not especially shown in the drawing, it is to be understood that the clamping jaws 9 are secured from falling out of the cup-shaped part 8.

The clamping mechanism according to the invention is associated with two tools 10 and 11, each of which is removably and adjustably secured to a slide 12 or 13, respectively, and may with the slide be shifted on a guideway 14 or 15, in a direction transverse to the axis of shaft 4. The guideways are secured to the base 21. Tool 10 is merely designed for cutting off the pipe, while tool 11 is shaped both for cutting off and chamfering the pipe. The clamping mechanism which is provided at the other end of the same roller bed or a different roller bed does not necessarily require more than two conical members with clamping jaws, and only one tool for cutting off and chamfering, since at that end it will not be necessary to cut off a ring-like specimen which has to be tested.

In order to rotate a pipe by means of this internal clamping fixture, it is preferably placed on rollers, for example, steadies, and the end of the pipe which is to be worked on is shifted to such an extent over the clamping fixture that all of the clamping jaws will be disposed within the pipe. By shifting shaft 4 in the direction shown by arrow 16, all of the clamping jaws are then moved in the direction toward the inner wall of the pipe, and each of the two or three sets of jaws will then move independently from the other or others so that minor variations in the inner diameter of the pipe will thus be compensated. In order to shift the shaft 4 in axial direction, the inner surface of the bushing 4' may be formed with an inner screw thread engaging with a corresponding screw thread on the surface of the shaft portion located in the bushing 4' and the outer free end of the shaft may be provided with a substantially square cross section for attachment of a turning lever thereto, so as to shift shaft 4 in an axial direction during turning of the same about its axis. Such compensation will be attained by the springs 6. After one end of the pipe is thus gripped by all of the clamping jaws 9, the rotation of members 3 and 8 may be started. After attaining the required speed, the two slides 12 and 13 may then be moved in the direction toward the rotating pipe so that tools 10 and 11 will not only cut off a ring 17 which may be used for scrap, but also a ring 18 which may be used as a specimen which is to be tested to determine the quality of the pipe and the strength of the welded seam thereof. In cutting off the specimen ring 18, the end of the pipe is also provided with a perfectly straight surface which extends vertically to the axis of the pipe, and which is also chamfered at its outer edge. Since the individual sets of clamping jaws 9 exert their clamping action independently of each other, rings 17 and 18 and pipe 19 will remain firmly mounted on the clamping fixture until the rotation of the latter is stopped and the jaws are released by moving shaft 4 in the direction opposite to that shown by arrow 16. The individual sets of clamping jaws may also be acted upon by springs which effect a disengagement of the jaws from the rings and the pipe. After slides 12 and 13 have been retracted, which may also be carried out while the clamping fixture is still in rotation, the individual parts may be removed from the clamping fixture while standing still. It is thus prevented that any cut-off portions might fly around loosely.

If a limit switch is mounted on the clamping fixture, for example, at 20, the clamping operation upon a pipe may also be carried out automatically. Such a limit switch may then close the circuit of the motor which drives the rotary element 3, 8. The limit switch may also be connected to a device for lifting and lowering the steadies supporting the pipe, or it may be provided for stopping the feed rollers which feed the pipe to the clamping fixture. Slides 12 and 13 may also be provided with limit switches which cause the tools to be retracted after they have completed the cutting and chamfering operations, and then cause the motor driving the rotary element 3, 8 to be stopped, the steadies to be lowered, and the feed rollers to be started, provided they do not rotate constantly, so that the entire operation of feeding, clamping and finishing the pipes may be carried out completely automatically. Also the transverse feeding means which feed the pipes to the roller bed and lead them away after they have been finished may be controlled in a similar manner.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A clamping fixture for pipes and the like of relatively large diameter, comprising, in combination, an elongated mandrel adapted to be located in the interior of the pipe to be clamped and being formed with an axially extending bore therethrough and with a plurality of radial guide channels extending respectively from said bore to the outer periphery of said mandrel and being arranged in at least three sets closely spaced in axial direction of said mandrel from each other; a clamping member slidably arranged in each of said guide channels so as to form three axially spaced sets of clamping members; a central shaft located in said bore movable in axial direction; at least three frustoconical members one for each set of clamping members, said frustoconical members being slidably arranged one after the other on said shaft with the taper thereof facing in the same direction so that the small diameter end of the first of said frustoconical members faces the large diameter end of the second frustoconical member and the small diameter end of the second frustoconical member faces the large diameter end of the third frustoconical member, said frustoconical members being respectively arranged centrally within said sets of clamping members; abutment means fixed to said shaft and facing the large diameter end of said first frustoconical member; and at least three of compression spring means, one located between said abutment means and said first frustoconical member and the others respectively between said first and second and between said second and third frustoconical members, so that upon movement of said shaft in an axial direction in which said abutment means approaches said first frustoconical member said compression spring means will be compressed to move said frustoconical members in said direction and to move thereby said clamping members in radial direction into clamping engagement with the inner surface of the pipe and whereby the clamping pressure of said clamping members will be equalized by said spring means.

2. A clamping fixture as defined in claim 1 in which said compression spring means are in the form of curved spring washers slidably arranged on said shaft.

References Cited in the file of this patent

UNITED STATES PATENTS

| | | |
|---|---|---|
| 599,275 | Webb | Feb. 15, 1898 |
| 1,192,063 | Hoberg | July 25, 1916 |
| 1,241,319 | Wiley | Sept. 25, 1917 |
| 1,610,463 | Mirfield et al. | Dec. 14, 1926 |
| 1,618,037 | Wright | Feb. 15, 1927 |
| 2,392,612 | Olson | Jan. 8, 1946 |
| 2,734,749 | Benjamin | Feb. 14, 1956 |